US012589045B2

(12) United States Patent
Schaub

(10) Patent No.: US 12,589,045 B2
(45) Date of Patent: Mar. 31, 2026

(54) WALL MOUNT FOR MOUNTING A MEDICAL DEVICE

(71) Applicant: Markus Schaub, Wetzlar (DE)

(72) Inventor: Markus Schaub, Wetzlar (DE)

( * ) Notice: Subject to any disclaimer, the term of this patent is extended or adjusted under 35 U.S.C. 154(b) by 786 days.

(21) Appl. No.: 17/960,307

(22) Filed: Oct. 5, 2022

(65) Prior Publication Data

US 2023/0108317 A1 Apr. 6, 2023

(30) Foreign Application Priority Data

Oct. 6, 2021 (DE) ..................... 10 2021 125 906.1

(51) Int. Cl.
*A61G 12/00* (2006.01)

(52) U.S. Cl.
CPC .................................. *A61G 12/005* (2013.01)

(58) Field of Classification Search
CPC .... A61G 12/005; F16M 11/041; F16M 13/02; A61M 5/1415; A61M 2209/082; A61M 2209/084
See application file for complete search history.

(56) References Cited

U.S. PATENT DOCUMENTS

D221,366 S * 8/1971 Staternus ..................... D24/128
4,674,722 A * 6/1987 Danby ................... F16M 11/16 248/124.2
5,322,253 A * 6/1994 Stevens ................ F16M 13/022 248/231.71
5,456,655 A * 10/1995 Morris ................. A61G 7/1042 5/81.1 R
5,966,760 A * 10/1999 Gallant ................. A61M 16/10 5/503.1
6,285,758 B1 * 9/2001 Lu ....................... B60R 11/0241 379/446
6,481,679 B1 * 11/2002 Bennett ................ F16M 13/022 248/223.41
9,121,423 B2 * 9/2015 Sharpe ................. F16M 11/105
9,523,374 B2 * 12/2016 Yazykov ................. F17C 13/08
D853,224 S * 7/2019 Bacallao ......................... D8/373
11,215,313 B1 * 1/2022 Beil ................... F16M 11/2014
11,547,516 B2 * 1/2023 Schaub .................. A61B 50/31
2009/0054843 A1 * 2/2009 Lundqvist ............. A61M 25/02 604/177

(Continued)

FOREIGN PATENT DOCUMENTS

CN 2236323 Y * 10/1996
CN 201642616 U * 11/2010

(Continued)

*Primary Examiner* — Ryan D Kwiecinski
(74) *Attorney, Agent, or Firm* — Millen, White, Zelano & Branigan, P.C.; Christopher W. Brody

(57) ABSTRACT

The invention relates to a wall bracket (1) for releasably securing a medical appliance and an appliance-specific connection element. The wall bracket comprises a housing (2) which has a front side (3), a rear side (16), two longitudinal sides (11*a*, 11*b*), a lower side (5) and an upper side (6). A connection geometry (4) for an appliance-specific connection element is arranged at the front side (3). A locking element (24) can be moved through an opening (23) of the connection geometry (4), wherein the locking element (24) can be moved by means of a lever (12) which is supported in the housing (2) between an open position and a locking position.

19 Claims, 3 Drawing Sheets

(56) References Cited

U.S. PATENT DOCUMENTS

Figure 2:
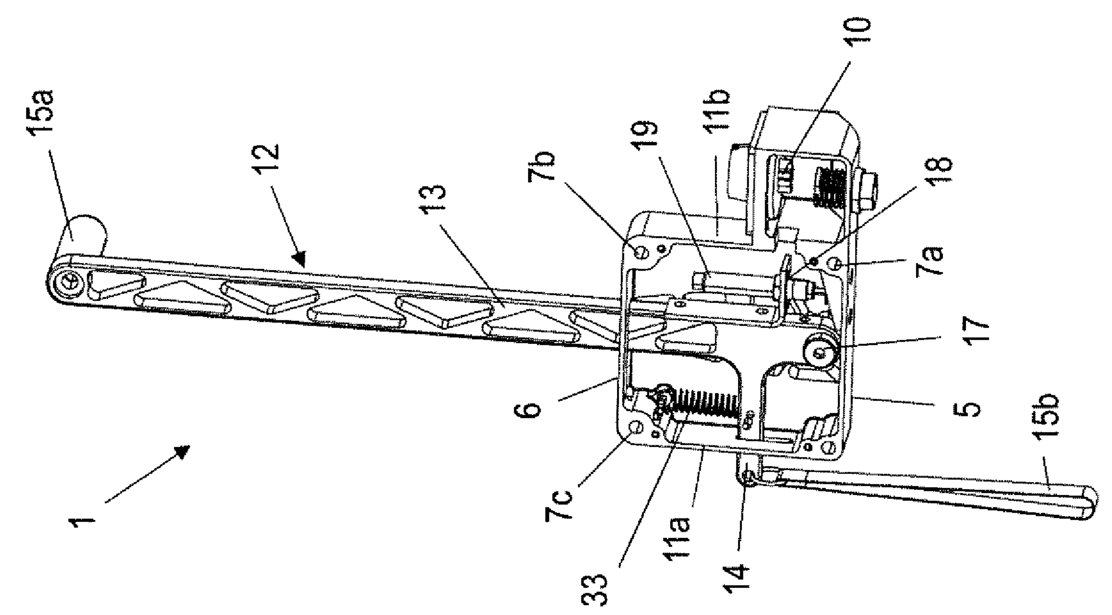

| | | | | |
|---|---|---|---|---|
| 2010/0205739 | A1* | 8/2010 | Gallant | A61G 7/0507 5/421 |
| 2014/0374564 | A1* | 12/2014 | Schroeder | B60P 7/0815 248/503 |
| 2015/0059871 | A1* | 3/2015 | Stinson | F16L 5/02 137/360 |
| 2017/0347780 | A1* | 12/2017 | Bacallao | F16M 13/00 |
| 2018/0311007 | A1* | 11/2018 | Tyler, II | F16D 3/41 |
| 2022/0031543 | A1* | 2/2022 | Schaub | F16F 15/08 |
| 2022/0034444 | A1* | 2/2022 | Bouchard | A61M 5/1415 |
| 2023/0108317 | A1* | 4/2023 | Schaub | F16M 13/02 52/29 |
| 2024/0099918 | A1* | 3/2024 | D'Agostino | A61M 1/60 |

FOREIGN PATENT DOCUMENTS

| | | | | | |
|---|---|---|---|---|---|
| CN | 106536277 | A | * | 3/2017 | F16M 11/041 |
| CN | 212090408 | U | * | 12/2020 | A61M 5/1415 |
| CN | 218128746 | U | * | 12/2022 | |
| CN | 223143646 | U | * | 7/2025 | |
| DE | 10 2012 025 066 | | | 6/2013 | |
| DE | 102012025066 | A1 | * | 6/2013 | A61M 5/1417 |
| DE | 10 2017 110 001 | | | 11/2018 | |
| DE | 102017110001 | A1 | * | 11/2018 | F16M 11/041 |
| DE | 102021125906 | A1 | * | 4/2023 | F16M 11/041 |
| TW | M605081 | U | * | 12/2020 | |
| WO | WO-9701363 | A1 | * | 1/1997 | F16M 13/022 |
| WO | WO-2016026547 | A1 | * | 2/2016 | A61G 13/107 |
| WO | WO-2017114718 | A1 | * | 7/2017 | A61M 5/445 |
| WO | WO-2018007675 | A1 | * | 1/2018 | A61M 39/24 |
| WO | WO-2020239252 | A1 | * | 12/2020 | A61M 16/0057 |
| WO | WO-2021062558 | A1 | * | 4/2021 | F16M 13/022 |
| WO | WO-2021074176 | A1 | * | 4/2021 | A61M 5/14248 |

* cited by examiner

WALL MOUNT FOR MOUNTING A MEDICAL DEVICE

The invention relates to a wall bracket for releasably securing a medical appliance. The wall bracket has a housing which has a front side, a rear side, two longitudinal sides, a lower side and an upper side, wherein a connection geometry for an appliance-specific connection element is arranged at the front side.

The term "wall" is intended in this instance to be understood to refer to any planar element which extends in a substantially perpendicular manner, that is to say, for example, not only stationary walls of a building, but also corresponding mobile devices or securing possibilities, for example, in vehicles of all types. The wall bracket can consequently be used for securing medical appliances in particular during mobile use in vehicles for patient transport or during mobile intensive care in hospital and/or rescue vehicles on land, in the air or in water.

DE 10 2017 110 001 A1 discloses such a wall bracket which is constructed in a substantially right-angled manner and which has perpendicularly to a wall portion which can be secured to a wall a receiving portion which is provided with a dovetail guide for receiving an appliance-specific connection element. In order to release the appliance-specific connection element, a locking element which is arranged in the region of the connection geometry may be unlocked by means of a push-button.

Depending on the installation situation, it may be difficult to activate the push-button. In particular the operating forces may be relatively high in this instance.

An object of the invention is now to provide a wall bracket which, on the one hand, provides secure retention for the medical appliance, but, on the other hand, also enables simple removal of the medical appliance.

This object is achieved according to the invention in a wall bracket for releasably securing a medical appliance to a housing which has a front side, a rear side, two longitudinal sides, a lower side and an upper side, wherein a connection geometry for an appliance-specific connection element is arranged at the front side, in that a locking element can be moved through an opening of the connection geometry, wherein the locking element can be moved by means of a multi-arm lever which is supported in the housing between an open position and a locking position.

As a result of the use of a multi-arm lever, this lever can be operated from different positions. In this instance, the operating forces by means of appropriate selection of the lever relationships, that is to say, in particular the length of the arms, can be selected relatively freely. The housing is in this instance in particular constructed in a parallelepipedal manner, wherein the wall bracket can be secured with the rear side thereof to a wall. The front side extends in this instance preferably parallel with the rear side and consequently in the mounted state faces a space.

Preferably, the lever has a main arm and an auxiliary arm, wherein the main arm protrudes through an upper slot in the upper side and the auxiliary arm protrudes through a lateral slot in one of the longitudinal sides. The upper side corresponds in this instance to the side which in the mounted state of the wall bracket is directed upwards and extends substantially horizontally. The main arm and the auxiliary arm can be guided through the slots in a simple manner out of the housing and can accordingly be readily activated by a user.

Preferably, there is arranged in the housing a restoring arrangement which cooperates with the lever, wherein the restoring arrangement comprises in particular a restoring spring which cooperates with the auxiliary arm. Consequently, the restoring arrangement is well protected from external influences. The restoring spring in this instance represents a simple, reliable component which loads the lever in such a manner that the locking element is retained in the locking position. A restoring action then has such a magnitude that, when the appliance-specific connection element is coupled to the wall bracket, the locking element is pressed out of the locking position into an open position without an activation of the lever being required.

In a preferred development, the lever has a restoring arm, wherein the restoring arrangement in particular has a damper element which cooperates with the restoring arm. The restoring arm can in contrast remain in the housing and together with the restoring arrangement be covered thereby. The damper element damps excessively rapid restoring movement and thus ensures lower material loads. Particularly with a sudden release of the lever, a rapid swinging back can thus be prevented.

In a preferred embodiment, the lever is supported on an axle which extends perpendicularly to the front side and which can be moved in a plane which extends parallel with the front side. In the assembled state of the wall bracket, the lever is consequently moved parallel with the wall and not into the space. There is consequently no risk that a user can strike it. Furthermore, the spatial requirement for the movement of the lever is kept small.

Preferably, the locking element is guided in a linear guide and is in particular in the form of a cylindrical member. A cylindrical member can be produced in a relatively simple manner and can be guided in a relatively simple manner in a linear guide which is in the form of a hole. At the same time, it is capable of absorbing sufficiently high forces and consequently bringing about a secure locking.

In this instance, it is particularly preferable for the locking element to be mechanically connected to the lever, in particular to the main arm. A mechanical connection, for example, via a locking pin which is arranged perpendicularly to the locking element and which is connected in a positive-locking manner to the main arm and/or the locking element, constitutes a reliable and maintenance-free connection.

Preferably, the connection geometry is in the form of a dovetail guide which is arranged at the front side and which extends from the lower side to the upper side, wherein it tapers in particular in the direction towards the upper side. A dovetail guide acting as a positive-locking connection represents a very reliable connection which can absorb high forces. As a result of a tapering configuration, a freedom from play is achieved. The occurrence of vibrations between the appliance-specific connection element and the wall bracket and resulting interference noises is consequently also reliably prevented during use in mobile devices, such as rescue vehicles.

In this instance, the locking element is preferably guided in a channel which opens in a flank of the dovetail guide. The channel is, for example, in the form of a blind hole which is open in the direction towards the flank of the dovetail guide. This opening is consequently well protected and cannot be seen when viewed in the direction towards the front side of the wall bracket.

In a preferred embodiment, there is arranged at the front side a support which protrudes in particular at right-angles from the front side. The appliance-specific connection element can be supported on this support, can absorb the corresponding forces and can thereby relieve the dovetail guide.

In this instance, the support preferably adjoins a lower end of the connection geometry and has at least one centring pin. The space which is available is thereby well used. A gap between the connection geometry and the support which would be difficult to clean is consequently prevented. As a result of the centring pin, the appliance-specific connection element is stabilised on the wall bracket, which is advantageous, in particular with large and/or heavy devices.

In a preferred development, the wall bracket has electrical connections. An energy supply of the medical appliance can thereby automatically be carried out with the receiving member in the wall bracket and, for example, an accumulator which is provided in the medical appliance can be charged. It is also conceivable to use the electrical connections for electronic signal transmission and thus to network the medical appliance with other devices.

Preferably, the front side has continuous securing openings in the corners thereof. Through these, it is possible to guide, for example, screws or other securing means which are easily accessible from the front side.

Advantageously, application means for manual operation are arranged on the main arm and auxiliary arm. The application means may, for example, be in the form of grips or loops and facilitate the operation. Furthermore, they can be used for adaptation to the spatial circumstances in which they accordingly extend the lever in a desired direction.

Preferably, the main arm extends perpendicularly to the auxiliary arm and perpendicularly to the restoring arm, wherein the restoring arm is arranged at a side of the main arm opposite the auxiliary arm. The axle is then located, for example, at the lower end of the main arm. As a result of such an arrangement, different access regions can be produced with at the same time relatively compact dimensions.

The object mentioned in the introduction is also achieved with an appliance-specific connection element for a wall bracket as described above, wherein it has a connection geometry which corresponds to the connection geometry of the wall bracket and a receiving face for the medical appliance extends in an angled manner, in particular at right-angles to a plane in which the connection geometry extends. Such an appliance-specific connection element is securely connected to the medical appliance and remains thereon when the medical appliance is removed from the wall bracket. The wall bracket can consequently be used for different medical appliances since the respective appliance-specific adaptation is carried out to the connection element. In particular, the acting weight can then be taken up via the receiving face and be transmitted to the wall bracket.

Figure 1:
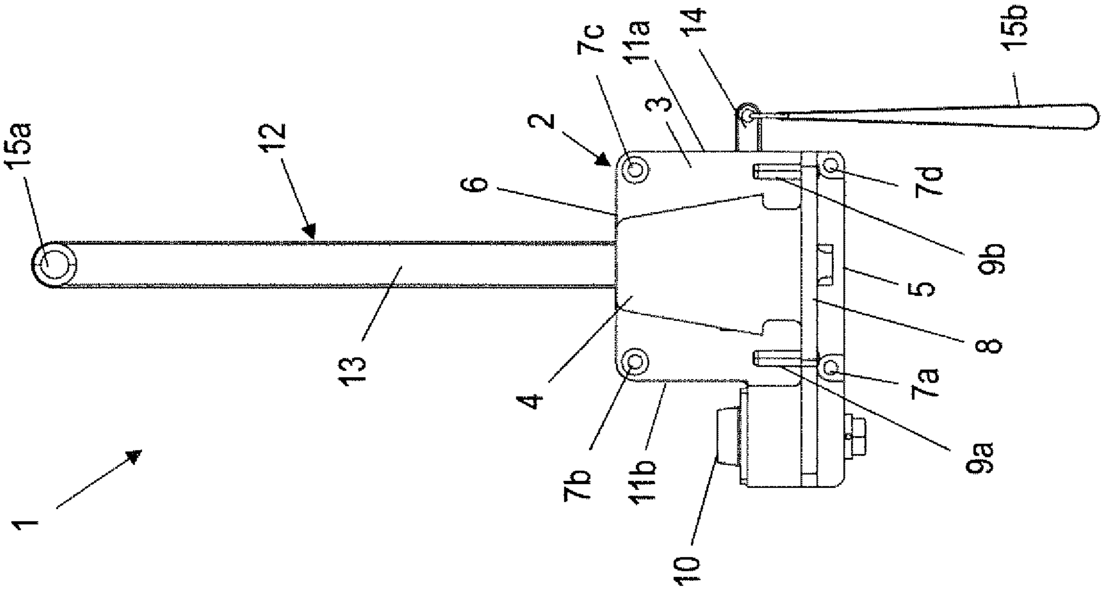
Figure 4:
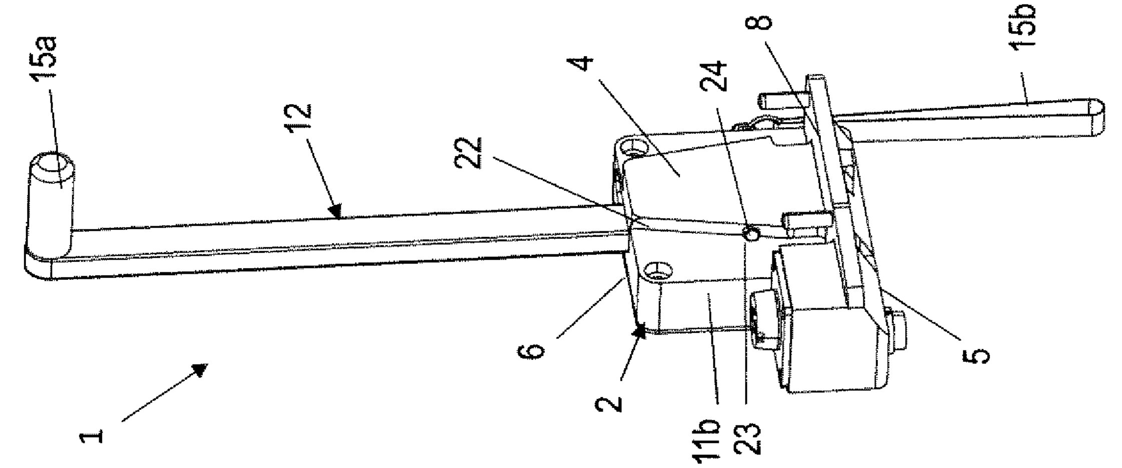
Figure 3:
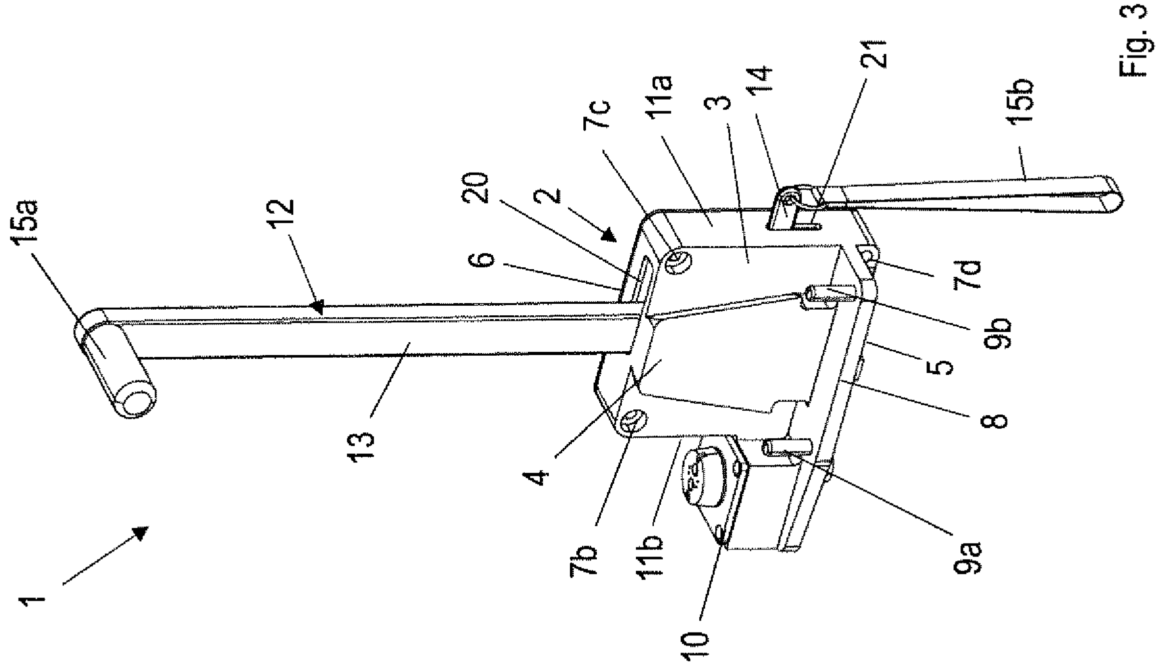

The invention is explained in greater detail below with reference to a preferred embodiment on connection with the drawings, in which:

FIG. 1: shows a front view of the wall bracket,

FIG. 2: shows a rear view of the wall bracket,

FIG. 3: shows a perspective side view of the wall bracket,

FIG. 4: shows another perspective side view of the wall bracket, and

Figure 5:
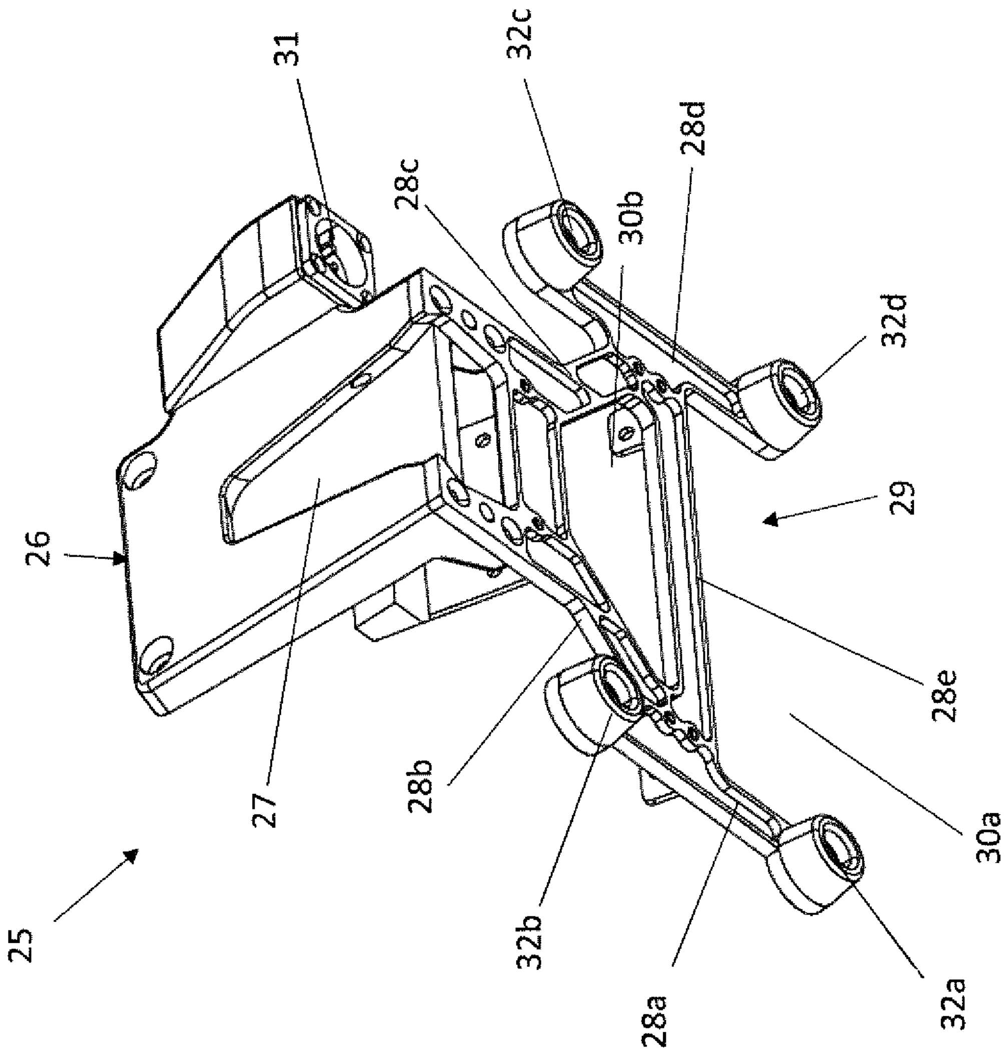

FIG. 5: shows an appliance-specific connection element.

FIG. 1 shows a wall bracket 1 as a front view. The wall bracket 1 comprises a housing 2 having a front side 3, on which a connection geometry 4 for an appliance-specific connection element which is not illustrated is arranged. The connection geometry 4 is in the form of a dovetail guide which tapers between a lower side 5 and an upper side 6 and in the direction of the upper side 6.

The application-specific connection element can be pushed downwards onto this dovetail guide. To this end, the appliance-specific connection element has a connection geometry which corresponds to the connection geometry 4 or the dovetail guide.

In the housing 2 there are provided four securing openings 7*a*, 7*b*, 7*c*, 7*d* through which corresponding securing means can be inserted in order to secure the wall bracket to a wall or another corresponding element.

From the front side out of the drawing plane, there protrudes a support 8 which is flush with a lower end of the connection geometry 4 and the lower side 6. The support 8 extends perpendicularly to the front side 3 and parallel with the lower side 6 and serves to support the appliance-specific connection element when it is connected to the wall bracket.

In this instance, the support has two centring pins 9*a*, 9*b* which can cooperate with corresponding receiving members which are constructed in the appliance-specific connection element. The centring pins support a secure retention of the connection element on the wall bracket.

Laterally beside the connection geometry or the centring pins 9*a*, 9*b*, there are formed electrical connections 10 via which, for example, an electrical energy supply and/or a networking of the medical appliance can be carried out.

From the housing 2 of the wall bracket 1, a lever 12 protrudes at the upper side 6 and a longitudinal side 11*a*. A main arm 13 of the lever 12 extends in this instance in an upward direction and an auxiliary arm 14 of the lever 12 extends to the side. At one end of the main arm 13, there is arranged an application means 15*a* which is in the form of a gripping element which protrudes perpendicularly to the main arm and out of the drawing plane. At one end of the auxiliary arm 14, another application element 15*b* in the form of a loop is arranged.

FIG. 2 shows the wall bracket from the rear. The housing 2 has a rear side 16 which can be closed by means of a cover which is not illustrated. The lever 12 is pivotably supported in the housing 2 by means of an axle 17 which is arranged at a lower end of the main arm 13.

At a side of the main arm 13 remote from the auxiliary arm 14, a restoring arm 18 is arranged. The restoring arm 18 is located completely inside the housing 2 and carries a damper element of a restoring arrangement 19. The damper element cooperates in this instance with a contact face which is formed inside the housing 2.

The restoring arrangement 19 further comprises a restoring spring 33 which acts between the housing 2 and the auxiliary arm 14 and acts on the lever 12 in the direction of a locking position in which the main arm 13 extends substantially perpendicularly.

FIG. 3 shows the wall bracket 1 obliquely from one side. An upper slot 20 which is formed in the upper side 6 and a lateral slot 21 which is formed in the longitudinal side 11*a* can thereby be seen, through which slots the main arm 13 or the auxiliary arm 14 protrude.

FIG. 4 shows the wall bracket from the other side. An opening 23 of a channel, in which a locking element 24 is guided, is formed in a flank 22 of the connection geometry 4 or the dovetail guide. For locking, this locking element 24 is pushed slightly out of the opening 23 and brings about a positive-locking connection to a corresponding recess of the appliance-specific connection element. In an open position, the locking element 24 is in contrast received completely in the channel and does not protrude out of the opening 23.

FIG. 5 shows an appliance-specific connection element 25. The appliance-specific connection element 25 has a perpendicular portion 26 in the rear side of which a connection geometry 27 which corresponds to the connection geometry 4 is formed.

At right-angles with respect to the perpendicular portion 26, a receiving face 29 which is formed by a plurality of webs 28*a*, 28*b*, 28*c*, 28*d*, 28*e* for the medical appliance is provided. Free spaces 30*a*, 30*b* are formed between the webs 28*a*, 28*b*, 28*c*, 28*d*, 28*e*. The appliance-specific connection element may accordingly be constructed to be lightweight.

Laterally on the perpendicular portion 28 there is arranged an electrical connector 31 which can cooperate with the electrical connections 10 of the wall bracket.

At a lower side of the webs 28*a*, 28*b*, 28*c*, 28*d* there are arranged base elements 32*a*, 32*b*, 32*c*, 32*d* on which the appliance-specific connection element 25 can be placed when it has been released from the wall bracket. A stable state is also consequently ensured with the received medical appliance.

LIST OF REFERENCE NUMERALS

1 Wall bracket
2 Housing
3 Front side
4 Connection geometry
5 Lower side
6 Upper side
7 Securing openings
8 Support
9 Centring pins
10 Electrical connections
11 Longitudinal sides
12 Lever
13 Main arm
14 Auxiliary arm
15 Application means
16 Rear side
17 Axle
18 Restoring arm
19 Restoring arrangement
20 Upper slot
21 Lateral slot
22 Flank
23 Opening
24 Locking element
25 Connection element
26 Portion
27 Connection geometry
28 Webs
29 Receiving face
30 Free spaces
31 Electrical connector
32 Base elements
33 Restoring spring

The invention claimed is:

1. A wall bracket (1) for releasably securing a medical appliance to a housing (2) which has a front side (3), a rear side (16), two longitudinal sides (11*a*, 11*b*), a lower side (5) and an upper side (6), wherein a connection geometry (4) for an appliance-specific connection element is arranged at the front side (3), wherein a locking element (24) can be moved through an opening (23) of the connection geometry (4), wherein the locking element (24) can be moved by means of a multi-arm lever (12) which is supported in the housing (2) between an open position and a locking position, wherein the lever (12) has a main arm (13) and an auxiliary arm (14), wherein the main arm (13) protrudes through an upper slot (20) in the upper side (6) and the auxiliary arm (14) protrudes through a lateral slot (21) in one of the longitudinal sides (11*a*).

2. The wall bracket according to claim 1, further comprising a restoring arrangement which cooperates with the lever, wherein the restoring arrangement (19) comprises a restoring spring (33) which cooperates with the auxiliary arm (14).

3. The wall bracket according to claim 1, characterised in that the lever has a restoring arm (18), wherein a restoring arrangement (19), which cooperates with the lever, has a damper element which cooperates with the restoring arm (18).

4. The wall bracket according to claim 1, characterised in that the locking element (24) is guided in a linear guide.

5. The wall bracket according to claim 4, wherein the locking element is in the form of a cylindrical member.

6. The wall bracket according to claim 1, characterised in that the locking element (24) is mechanically connected to the lever (12).

7. The wall bracket according to claim 6, wherein the locking element is connected to the main arm.

8. The wall bracket according to claim 1, characterised in that the connection geometry (4) is in the form of a dovetail guide which is arranged at the front side (3) and which extends from the lower side (5) to the upper side (6), wherein the dovetail guide tapers in a direction towards the upper side (6).

9. The wall bracket according to claim 8, characterised in that the locking element (24) is guided in a channel which opens in a flank (22) of the dovetail guide (4).

10. The wall bracket according to claim 1, characterised in that there is arranged at the front side (3) a support (8) which protrudes from the front side (3).

11. The wall bracket according to claim 10, characterised in that the support (8) adjoins a lower end of the connection geometry (4) and has at least one centering pin.

12. The wall bracket according to claim 10, wherein the support (8) protrudes at a right angle from the front side (3).

13. The wall bracket according to claim 1, further comprising electrical connections (10).

14. The wall bracket according to claim 1, characterised in that application means (15*a*,15*b*) for manual operation are arranged on the main arm (13) and the auxiliary arm (14).

15. The wall bracket according to claim 1, characterised in that the main arm (13) extends perpendicularly to the auxiliary arm (14) and perpendicularly to a restoring arm (18), wherein the restoring arm (18) is arranged at a side of the main arm (13) opposite the auxiliary arm (14).

16. A wall bracket (1) for releasably securing a medical appliance to a housing (2) which has a front side (3), a rear side (16), two longitudinal sides (11*a*, 11*b*), a lower side (5) and an upper side (6), wherein a connection geometry (4) for an appliance-specific connection element is arranged at the front side (3), wherein a locking element (24) can be moved through an opening (23) of the connection geometry (4), wherein the locking element (24) can be moved by means of a multi-arm lever (12) which is supported in the housing (2) between an open position and a locking position, characterised in that the lever (12) is supported on an axle (17) which extends perpendicularly to the front side (3) and which can be moved in a plane which extends parallel with the front side (3).

17. An appliance-specific connection element in combination with the wall bracket according to claim 1, characterised in that the appliance-specific connection element has a connection geometry (27) which corresponds to the connection geometry (4) of the wall bracket (1), wherein a receiving face (29) for the medical appliance extends in an angled manner to a plane in which the connection geometry (27) extends.

18. The appliance-specific connection element according to claim 17, wherein the medical appliance extends in a right angle manner to the plane in which the connection geometry (27) extends.

19. A wall bracket (1) for releasably securing a medical appliance to a housing (2) which has a front side (3), a rear side (16), two longitudinal sides (11*a*, 11*b*), a lower side (5) and an upper side (6), wherein a connection geometry (4) for an appliance-specific connection element is arranged at the front side (3), wherein a locking element (24) can be moved through an opening (23) of the connection geometry (4), wherein the locking element (24) can be moved by means of a multi-arm lever (12) which is supported in the housing (2) between an open position and a locking position, characterised in that there is arranged at the front side (3) a support (8) which protrudes from the front side (3) and the support (8) adjoins a lower end of the connection geometry (4) and has at least one centering pin.

* * * * *